Patented Apr. 17, 1928.

1,666,342

UNITED STATES PATENT OFFICE.

ELNATHAN K. NELSON, OF TAKOMA PARK, MARYLAND, ASSIGNOR TO THE GOVERNMENT AND THE PEOPLE OF THE UNITED STATES OF AMERICA.

PROCESS FOR THE MANUFACTURE OF THYMOL FROM UMBELLULONE.

No Drawing. Application filed September 27, 1927. Serial No. 222,396.

(GRANTED UNDER THE PROVISIONS OF THE ACT OF MARCH 3, 1883, 22 STAT. L., 625.)

1. The conversion of umbellulone into thymol by heating it in the vapor phase at a temperature of 280° centigrade.

2. The conversion of the umbellulone in California laurel oil into thymol by distilling the oil and passing the vapors through a tube heated to 280° C. and separating the thymol formed by fractional distillation.

3. The conversion of umbellulone, separated from California laurel oil, into thymol by passing the vapors generated by boiling umbellulone through a tube provided with baffle plates and heated at 280° C. Finally extracting the thymol with a solution of sodium hydroxide, separating neutral oils, and separating the thymol from its solution by adding a mineral acid.

This application is made under the act of March 3, 1883, Chapter 143 (22 Stat. 625), and the invention herein described if patented may be used by the Government of the United States or any of its officers or employees in the prosecution of work for the Government, or by any other person in the United States, without payment to me of any royalty thereon.

I claim:—

1. The production of thymol from umbellulone by distilling California laurel oil and passing the vapors through a tube heated to 280° C. and separating the thymol formed by fractional distillation.

2. The production of thymol from umbellulone by distilling umbellulone, passing the vapors through a tube heated to 280° C. and separating thymol from the distillate by means of a solution of caustic alkali.

ELNATHAN K. NELSON.